United States Patent [19]

Mizuhara

[11] Patent Number: 5,330,098
[45] Date of Patent: Jul. 19, 1994

[54] SILVER-COPPER-ALUMINUM-TITANIUM BRAZING ALLOY

[75] Inventor: Howard Mizuhara, Hillsborough, Calif.

[73] Assignee: The Morgan Crucible Co., PLC, Great Britain

[21] Appl. No.: 975,982

[22] Filed: Nov. 13, 1992

Related U.S. Application Data

[63] Continuation of Ser. No. 670,453, Mar. 11, 1991, abandoned, which is a continuation of Ser. No. 267,885, Nov. 7, 1988, abandoned.

[51] Int. Cl.$^5$ .......................... B23K 1/00; B23K 35/24
[52] U.S. Cl. ..................................... 228/214; 228/221; 228/222; 428/606; 420/502; 148/430
[58] Field of Search ................. 420/502; 428/606; 228/263.18, 214, 221, 222.1; 148/430

[56] References Cited

U.S. PATENT DOCUMENTS

| | | | |
|---|---|---|---|
| 1,023,332 | 4/1912 | Rossi | 420/502 |
| 1,984,225 | 12/1934 | McFarland | 420/502 |

FOREIGN PATENT DOCUMENTS

| | | | |
|---|---|---|---|
| 23752 | 10/1969 | Japan | 420/502 |
| 28108 | 9/1970 | Japan | 420/502 |
| 6227 | 1/1986 | Japan | 420/502 |
| 34140 | 2/1986 | Japan | 420/502 |
| 34145 | 2/1986 | Japan . | |
| 34146 | 2/1986 | Japan | 420/502 |

OTHER PUBLICATIONS

Metals, Handbook Ninth Edition, vol. 6 p. 3, 1983.

*Primary Examiner*—John P. Sheehan
*Attorney, Agent, or Firm*—McCubbrey, Bartels & Ward

[57] ABSTRACT

An alloy for brazing ceramics has the following composition, in weight percent: 0.5 to 3% titanium; 0.25 to 2% aluminum, silicon or tin; 2 to 6% copper; balance silver.

14 Claims, No Drawings

SILVER-COPPER-ALUMINUM-TITANIUM BRAZING ALLOY

This application is a continuation, of application Ser. No. 07/670,453 filed Mar. 11, 1991, now abandoned which in turn is a continuation of application Ser. No. 07/267,885 filed Nov. 7, 1988, now abandoned.

This invention concerns copper-silver brazing alloys containing titanium as an active metal for brazing, for example, to ceramics. Such brazing alloys are disclosed in U.S. Pat. Nos. 4,766,041, 4,735,866, 4,698,271, 4,684,579, 4,643,875, 4,623,513, 4,591,535, 4,448,853, 3,455,663; in U.K. patents 2,167,989, 1,270,477, 932,729; in Canada patent 559,434; in European patent 0 038 584; in Auslegeschrift 1 030 756; in France patent 1 174 330. These brazing alloys do not generally have satisfactory oxidation resistance at temperatures as high as 700° C.

A brazing alloy in accordance with this invention has the following composition, in weight percent: 0.5 to 3% titanium; 0.25 to 2% aluminum silicon or tin; 2 to 6% copper; balance silver. The alloy has good oxidation resistance at temperatures as high as 700° C.

In the following examples, the compositions are expressed in weight percent.

EXAMPLE 1

An alloy with a composition of 92.5% Ag, 5% Cu 1.5% Ti, 1% Al was melted on a copper hearth using a tungsten electrode. The alloy button was rolled to a 2 mil thickness foil. A type 410 stainless steel rod, ¼" diameter by 0.3" long, was placed on top of a thermally treated Al-500 alumina slab measuring 1 ¼" square by 80 mils thick with a ½". square preform of the 2 mil foil therebetween. The assembly was brazed at 920° C. by 10 minute soak under $10^{-5}$ tort vacuum. The rod was joined to the alumina substrate with a full fillet. The melted alloy was bright and with metallic luster.

EXAMPLE 2

An alloy with a composition of 93 25% silver, 5% copper, 0.25% aluminum, 1.5% titanium was prepared and tested as in Example 1.

The melted alloy did bond the stainless steel rod to the alumina substrate; however the alloy did not form a fillet.

EXAMPLE 3

An alloy with a composition of 92 5% silver, 5% copper, 1% tin, 1.5% titanium was prepared and tested as in Example 1.

A good bond of the rod to the alumina substrate resulted; however the fillet was smaller than that obtained in Example 1.

EXAMPLE 4

A 2 mil thick foil of 92 5% Ag, 5% Cu 1% Al 15% Ti alloy was placed on a silicon nitride substrate with an Inconel 718 ¼"×¼" cell honeycomb on top. The assembly was brazed at 920° C. under $10^{-5}$ tort vacuum. An excellent braze resulted with a small fillet forming between the honeycomb and the silicon nitride.

EXAMPLE 5

An atomized alloy powder of silver, copper and aluminum was mixed with titanium hydride powder such that the final composition was about 92.5% Ag, 5% Cu 1% Al 1.5% Ti. The powder mixture was mixed with a screening oil in a ratio of 95% metal powder, 5% oil. The mix was screened through a 105 mesh screen on to a zirconia substrate and dried for one hour at 100° C. The coated ceramic was heated at 925° C. in $10^{-5}$ torr vacuum to melt the powder. An excellent 2 mil thickness coated zirconia resulted.

EXAMPLE 6

An atomized powder with a size of minus 270 mesh with a composition of 93.9% silver, 5.1% copper, and 1% silicon was blended with titanium hydride minus 325 mesh powder. The ratio used was 98.5% of silver alloy to 1.5% titanium hydride. The mix was compacted in a flat die at 5000 psi followed by rolling from about ¼" to 4 mil with two intermediate anneals. The foil was placed between 1" diameter × ¼" alumina disc, and ¼" diameter × ½" long 410 stainless steel rod. The assembly was brazed at 925° C. under $10^{-5}$ tort vacuum forming an excellent bond.

TABLE 1

| Sample | Compositions | | | | | | Liq/Sol °C. |
|---|---|---|---|---|---|---|---|
| | Ag | Cu | Si | Al | Ti | Sn | |
| A | 92.5 | 5 | | | 1.5 | 1 | 914/857 |
| B | 92.5 | 5 | | 1 | 1.5 | | 909/863 |
| C | 93.0 | 5 | | 0.5 | 1.5 | | 914/866 |
| D | 93.25 | 5 | | 0.25 | 1.5 | | 916/867 |
| E | 92.5 | 5 | 1 | | 1.5 | | 907/872 |

Table 1 shows compositional and liquidus and solidus temperatures for examples within this invention.

I claim:

1. A method of increasing oxidation resistance of a copper-silver-titanium braze on an article comprising the step of including in a copper-silver-titanium brazing material a small amount of aluminum such that the brazing material substantially comprises, in weight percent 0.5 to 3% titanium, 0.25 to 2% aluminum, 2 to 5% copper, balance silver and heating the article to a temperature sufficient to melt said brazing material.

2. A method of increasing oxidation resistance of a copper-silver-titanium braze on an article comprising the step of including in a copper-silver-titanium brazing material a small amount of tin such that brazing material substantially comprises, in weight percent 0.5 to 3% titanium, 0.25 to 2% tin, 2 to 6% copper, balance silver and heating the article to a temperature sufficient to melt said brazing material.

3. A method of increasing oxidation resistance of a copper-silver-titanium braze on an article comprising the step of including a in a copper-silver-titanium brazing material a small amount of silicon such that the brazing material substantially comprises, in weight percent 0.5 to 3% titanium, 0.25 to 2% silicon, 2 to 6% copper, balance silver and heating the article to a temperature sufficient to melt said brazing material.

4. The method of claim 1 wherein said brazing material comprises an alloy having a composition substantially comprised of, in weight percent 92.5 Ag, 5 Cu, 1.5 Ti, 1 Al.

5. The method of claim 2 wherein said brazing material comprises an alloy having a composition substantially comprised of, in weight percent 92.5 Ag, 5 Cu, 1 Sn, 1.5 Ti.

6. The method of claim 1 wherein said brazing material comprises an alloy having a composition substantially comprised of, in weight percent, 93 Ag, 5 Cu, 0.5 Al, 1.5 Ti.

7. The method of claim 1 wherein said brazing material comprises an alloy having a composition substantially comprised of, in weight percent, 93.25 Ag, 5 Cu, 0.25 Al, 1.5 Ti.

8. The method of claim 3 wherein said brazing material comprises an alloy having a composition substantially comprised of, in weight percent, 92.5 Ag, 5 Cu, 1 Si, 1.5 Ti.

9. The method of claim 1 wherein said heating is under vacuum.

10. The method of claim 2 wherein said heating is under vacuum.

11. The method of claim 3 wherein said heating is under vacuum.

12. The method of claim 1 wherein said article comprises a material selected from the group consisting of metals, ceramics and mixtures thereof.

13. The method of claim 2 wherein said article comprises a material selected from the group consisting of metals, ceramics and mixtures thereof.

14. The method of claim 3 wherein said article comprises a material selected from the group consisting of metals, ceramics and mixtures thereof.

* * * * *